United States Patent [19]

Léman et al.

[11] Patent Number: 5,229,701
[45] Date of Patent: Jul. 20, 1993

[54] BATTERY CHARGER FOR BATTERY-OPERATED EQUIPMENT

[75] Inventors: Ari Léman, Pertteli; Veli M. Välimaa, Salo, both of Finland

[73] Assignee: Nokia Mobile Phones Ltd., Salo, Finland

[21] Appl. No.: 674,528

[22] Filed: Mar. 22, 1991

[30] Foreign Application Priority Data

Apr. 12, 1990 [FI] Finland .................................. 901889

[51] Int. Cl.⁵ .................... H01M 10/46; H01M 45/04
[52] U.S. Cl. .......................................... 320/2; 455/90; 320/25
[58] Field of Search ..................................... 320/2, 25

[56] References Cited

U.S. PATENT DOCUMENTS 3,644,873  2/1972  Dalton et al. ................. 320/2 X
3,665,285  5/1972  Mullersman et al. ............ 320/2
4,558,270 12/1985  Liautaud et al. ............... 320/2
5,052,943 10/1991  Davis ......................... 320/2 X
5,059,885 10/1991  Weiss et al. .................. 320/2

Primary Examiner—R. J. Hickey
Attorney, Agent, or Firm—Darby & Darby

[57] ABSTRACT

The invention relates to a battery charger for battery operated equipment such as a mobile telephone. The charger has a recess into which the equipment to be charged is placed for charging, and the recess has charging contacts through which current passes from the charger to the equipment to be charged. The first two opposite sides of the recess have guide fins, while the equipment to be charged has corresponding grooves. Different equipment models having different thicknesses, but a common width dimension, can be charged in the same battery charger.

4 Claims, 1 Drawing Sheet

BATTERY CHARGER FOR BATTERY-OPERATED EQUIPMENT

BACKGROUND OF THE INVENTION

The present invention relates to a battery charger for a battery-operated equipment or device such as a mobile telephone, said charger having a recess into which the equipment to be charged is placed for charging, and said recess having charging contacts via which current passes from the charger to the equipment to be charged.

In prior art constructions the battery chargers are equipment-specific, and with modifications in the equipment design, the charger construction has been also subjected to alterations. The recess of the charger has always been shaped compatible with the portion of the equipment to be introduced into the recess.

SUMMARY OF THE INVENTION

It is an object of the present invention to overcome the above-described drawbacks. The battery charger in accordance with the invention is provided with fins on two opposite sides of a recess. The equipment to be charged has guide grooves compatible with the fins. Because the guide fins of the charger take care of aligning the equipment with respect to the electric charging contacts, greater freedom in equipment design is gained. Thence, enclosure design for guidance during insertion of equipment in he charger becomes unnecesary. Further, guide fins prevent the equipment from falling and the electric contacts from disengaging even if the equipment or the charger should be tilted. The space required by the guidance means is minimal.

A preferred embodiment of the invention includes a recess of rectangular shape having a first pair of opposite sides with fins protruding therefrom. The distance between the fins corresponds to the spacing between the equipment grooves; the distance between the other opposite walls of the recess being at least equal to the thickness of the equipment to be charged, a variation of equipment types of differing thicknesses being subject to accommodation in the same recess. Consequently, only one battery charger type is needed for a family of equipment types, which brings reductions in tooling are mass production costs. The family of equipment can include several models of different design; yet all fit in a single model of the battery charger.

BRIEF DESCRIPTION OF THE DRAWING

In the following, the invention is described by way of an exemplifying embodiment, with reference to the attached drawings in which.

DESCRIPTION OF THE PREFERRED EMBODIMENT

Figure 1:
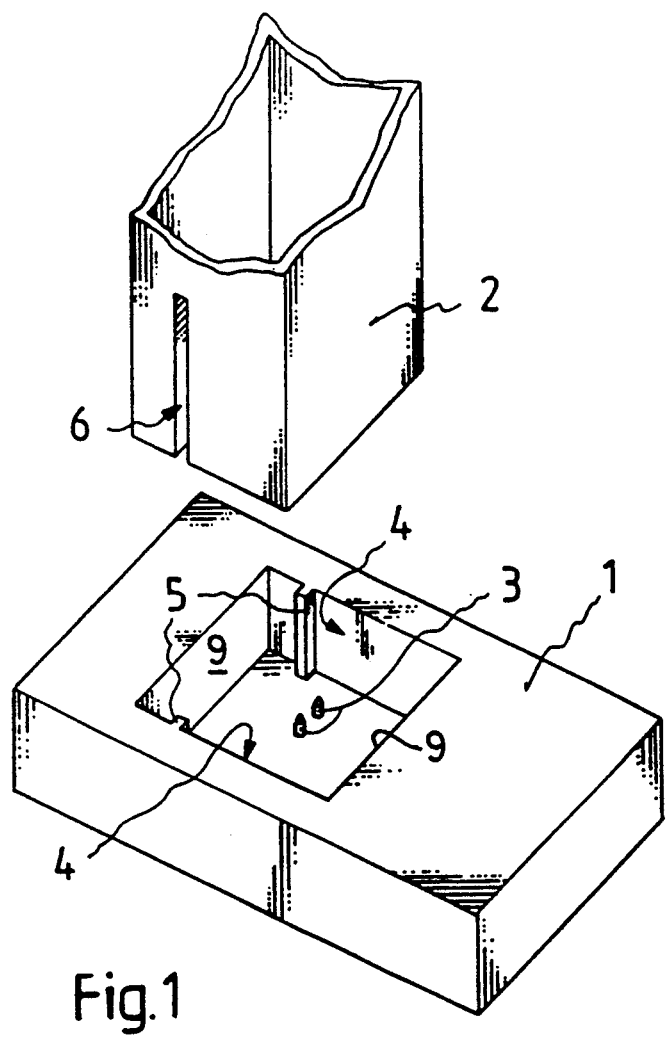
FIG. 1 is a top perspective view of the battery charger in accordance with the invention and a portion of the equipment to be inserted in the charger.

The upper part of the battery charger 1 has a recess into which an equipment or device 2 to be charged is inserted for charging. The recess is provided with charging contacts 3 through which the charging current passes from the charger 1 to the equipment 2 to be charged. The first opposite sides 4 of the recess have guide fins 5, while the equipment 2 to be charged has grooves 6 corresponding to the fins 5. Constant values are used in the charger design for the thickness of the fins 5, the spacing of the fins, and the distance between the first sides 4 on which the fins are positioned.

Figure 2:
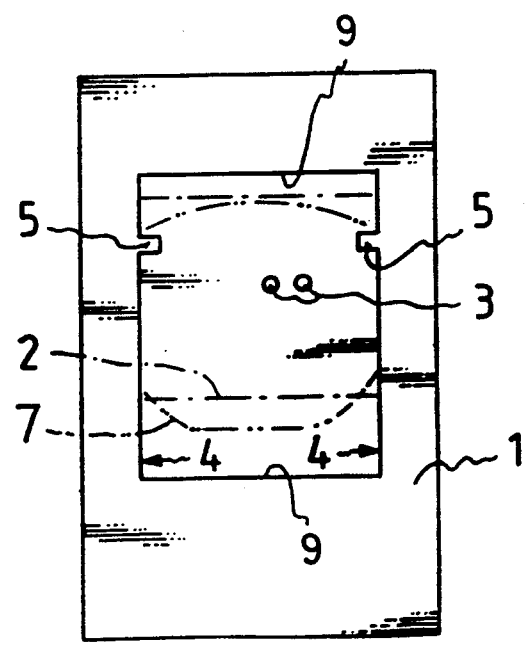
FIG. 2 shows the battery charger in a top view directly from above.

The distance between the second sides 9 of the recess is significantly larger than the thicknesses of the equipment 2, 7 to be charged. Thickness may vary between the different types or models of equipment. As is evident from FIG. 2, the shape of the equipment 2, 7 can be widely varied, yet still retaining their compatibility with the same battery charger because of an unchanging relationship between the walls 4, contacts 3, fins 5 and grooves 6. The thickness of the equipment to be charged can, for example, have the shape indicated by the dot-dashed line 2, or alternatively, similar to that indicated by the double dot-dashed line 7.

The scope of the invention is not limited by the above-described exemplifying embodiment. The guidance means can alternatively be implemented by a design in which the fins are placed on the equipment, while the corresponding grooves are in the battery charger.

We claim:

1. A battery charger for use with a family of battery-operated devices, such as mobile telephones, all of said devices of said family having a base surface and side surfaces spaced apart by a similar width dimension, at least one of said devices having a different thickness from another of said family, said thickness being transverse to said width dimension, each said device having first contact means in the base surface for electrical connection to batteries located within said device comprising:

a body having a generally rectangular-shaped recess therein, said recess having a first pair of opposed walls and a floor perpendicular to said first pair of opposed walls, said recess having a width dimension corresponding to said width dimension of said family of devices, and second contact means in the floor of said recess, said second contact means being dimensioned and spaced apart similarly to said first contact means of said devices;

opposed pairs of corresponding grooves and fins on the side surfaces of said device and said recess for causing said fins to simultaneously enter said grooves when any device of said family is inserted in said recess, said grooves and fins being arranged generally perpendicular to both said base surface and floor, and said fins and grooves having a fixed dimensional relationship to said second contact means, one of said pairs of fins and grooves being positioned on said first opposed pair of walls and being closer to one of a second opposed pair of walls than to the other of said second opposed pair of walls, the length of said fins and grooves at least equalling the depth of said recess, said first pair of said second pair of opposed walls together defining said rectangular shape, said recess being dimensioned to receive therein the largest base surface of said family of devices, whereby every device in said family can be recharged in the same battery charger with automatic alignment by entering said fins in the grooves.

2. A battery charger as in claim 1, wherein the pair of fins are on the walls of the recess and the pair of grooves are on the side surfaces of the device.

3. A battery charger as in claim 1, wherein the pair of fins are on the side surfaces of the device and the pair of grooves are on the walls of the recess.

4. A battery charger as in claim 1, wherein the first contact means are a pair of similarly spaced openings in the base surface of each device and the second contact means is a pair of similarly spaced projections from said recess floor sized to enter said openings.

* * * * *

UNITED STATES PATENT AND TRADEMARK OFFICE
CERTIFICATE OF CORRECTION

PATENT NO. : 5,229,701

DATED : July 20, 1993

INVENTOR(S) : Ari LEMAN, et al.

It is certified that error appears in the above-identified patent and that said Letters Patent is hereby corrected as shown below:

At column 2, line 50, last word, change "of" to --and--.

Signed and Sealed this

Twenty-ninth Day of March, 1994

*Attest:*

BRUCE LEHMAN

*Attesting Officer*  *Commissioner of Patents and Trademarks*